United States Patent
Heo et al.

(10) Patent No.: US 10,651,680 B2
(45) Date of Patent: May 12, 2020

(54) UNINTERRUPTIBLE POWER SUPPLY APPARATUS AND METHOD

(71) Applicant: ELECTRONICS AND TELECOMMUNICATIONS RESEARCH INSTITUTE, Daejeon (KR)

(72) Inventors: Sewan Heo, Daejeon (KR); Wan Ki Park, Daejeon (KR); Jinsoo Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 166 days.

(21) Appl. No.: 16/021,413

(22) Filed: Jun. 28, 2018

(65) Prior Publication Data

US 2019/0280519 A1 Sep. 12, 2019

(30) Foreign Application Priority Data

Mar. 12, 2018 (KR) .................. 10-2018-0028672

(51) Int. Cl.
| | |
|---|---|
| *H02J 9/06* | (2006.01) |
| *H02J 1/10* | (2006.01) |
| *H02M 1/10* | (2006.01) |
| *H02J 7/34* | (2006.01) |
| *H02M 3/158* | (2006.01) |
| *H02J 1/04* | (2006.01) |

(52) U.S. Cl.
CPC ................ *H02J 9/061* (2013.01); *H02J 1/04* (2013.01); *H02J 1/102* (2013.01); *H02J 7/34* (2013.01); *H02J 9/062* (2013.01); *H02M 1/10* (2013.01); *H02M 3/1584* (2013.01); *H02J 9/068* (2020.01)

(58) Field of Classification Search
CPC ...... H02J 1/04; H02J 1/102; H02J 7/34; H02J 9/06; H02J 9/061; H02J 9/062; H02J 9/068; H02M 1/10; H02M 3/1584
USPC ....................................... 307/64, 66
See application file for complete search history.

(56) References Cited

U.S. PATENT DOCUMENTS

| | | |
|---|---|---|
| 2014/0097685 A1 | 4/2014 | Jun et al. |
| 2015/0220099 A1 | 8/2015 | Yoo et al. |
| 2015/0270745 A1 | 9/2015 | Ogura |

FOREIGN PATENT DOCUMENTS

| | | |
|---|---|---|
| KR | 10-2014-0095839 A | 8/2014 |
| KR | 10-1718387 B1 | 3/2017 |
| KR | 10-1742600 B1 | 6/2017 |

*Primary Examiner* — Hal Kaplan
(74) *Attorney, Agent, or Firm* — LRK Patent Law Firm

(57) ABSTRACT

An uninterruptible power supply apparatus and method. The uninterruptible power supply apparatus includes a first generator, an energy storage, a first power converter connected to the energy storage, a second power converter connected to the energy storage, a first switch connected to the first power converter and a first load, a second switch connected to the second power converter, the first generator and a second load, and a third switch connected to a power grid, the first generator, the second power converter, the first switch and the second switch. In a normal state in which the first switch and the third switch are connected, the power grid supplies power to the first load or the second load. In an independent operating state in which the third switch is turned off, the first generator or the energy storage uninterruptibly supplies power to the first load or the second load.

7 Claims, 8 Drawing Sheets

UNINTERRUPTIBLE POWER SUPPLY APPARATUS AND METHOD

CROSS-REFERENCE TO RELATED APPLICATION(S)

This application claims the priority benefit of Korean Patent Application No. 10-2018-0028672, filed on Mar. 12, 2018, in the Korean Intellectual Property Office, the disclosure of which is incorporated herein by reference for all purposes.

BACKGROUND

1. Field of the Invention

The following description relates to a technology for uninterruptibly supplying power, and relates to a technology for independently supplying power to loads using a power converter and a generator.

2. Description of Related Art

Heat generated in a process of transferring power produced by a power plant located at a distance to consumers is discarded and a portion of power is lost. To overcome such an issue, a separate local generator may simultaneously supply heat and power to consumers. However, when a power failure occurs in a power grid, an operation of the local generator may be stopped because the local generator is incapable of independently operating, and consumers may not inevitably avoid the power failure. The above information disclosed in the Background section is possessed or acquired by inventors in a process of achieving the inventive concept, and is not necessarily a technology publicly disclosed before the filing date of this application.

SUMMARY

Example embodiments provide an uninterruptible power supply apparatus that may uninterruptibly supply power to loads using a generator and a power converter.

Example embodiments provide an uninterruptible power supply apparatus that may uninterruptibly supply power to a load using a generator despite an insufficient capacity of a power converter.

According to an aspect, there is provided an uninterruptible power supply apparatus including a first generator, an energy storage, a first power converter connected to the energy storage, a second power converter connected to the energy storage, a first switch connected to the first power converter and a first load, a second switch connected to the second power converter, the first generator and a second load, and a third switch connected to a power grid, the first generator, the second power converter, the first switch and the second switch, wherein in a normal state in which the first switch and the third switch are connected, the power grid supplies power to the first load or the second load, and in an independent operating state in which the third switch is turned off, the first generator or the energy storage uninterruptibly supplies power to the first load or the second load.

In the normal state, the first convertor may not operate, and the second power converter connected to the energy storage, or the first generator may supply power together with the power supplied by the power grid based on a power consumption amount of the first load and a power consumption amount of the second load.

In the normal state, an output of the second power convertor may be changed from a constant current to a constant voltage, to have the same magnitude and the same phase as those of an output of the power grid. The normal state may be changed to the independent operating state by turning off the third switch.

In the independent operating state, the first power convertor may not operate, the second power converter connected to the energy storage may supply constant-voltage power to the first load or the second load, and the first generator may supply power together with power supplied by the second power converter based on a power consumption amount of the first load and a power consumption amount of the second load.

In the normal state, the first power converter may receive voltage information of the power grid. In an independent state in which the power grid, the second power converter and the first generator do not operate due to a power failure, the first power converter may supply constant-voltage power corresponding to the voltage information to the first load by turning off the first switch.

The second switch and the third switch may be turned off after the power failure.

According to another aspect, there is provided an uninterruptible power supply method including changing an output of a first generator based on a sum of a power consumption amount of a first load and a power consumption amount of a second load, setting an output of a second power converter to zero, transferring voltage information of a power grid to the second power converter, supplying, by the second power converter, constant-voltage power corresponding to the voltage information, and turning off a third switch connected to the power grid, the second power converter, the first load and the second load.

According to another aspect, there is provided an uninterruptible power supply method including, when a power grid, a first generator and a second power converter do not operate due to a power failure, changing a state of a first power converter to a constant voltage state, supplying constant-voltage power corresponding to voltage information of the power grid, and turning off a first switch, a second switch and a third switch, wherein the first switch is configured to open or close a connection between the power grid, the first generator and a first load, the second switch is configured to open or close a connection between a second load, the second power converter and the first generator, and the third switch is configured to open or close a connection between the power grid, the second power converter, the first load and the second load.

According to another aspect, there is provided an uninterruptible power supply method including changing a state of a second power converter to a constant voltage state, increasing an output of a first generator in correspondence to an output allowable value of the second power converter, connecting a second switch to a second load, the second power converter and the first generator, increasing the output of the first generator in correspondence to the output allowable value of the second power converter and a power consumption amount of the second load, adjusting an output voltage of the first power converter based on an output voltage of the second power converter, stopping an operation of the first power converter and connecting a first switch, and adjusting the output of the first generator based on a sum of a power consumption amount of the first load and a power consumption amount of the second load.

According to another aspect, there is provided an uninterruptible power supply method including adjusting an output voltage of a second power converter to correspond to voltage information of a power grid, changing a state of the second power converter to a constant current state, and connecting a third switch to the power Did, the second power converter, a first load and a second load.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
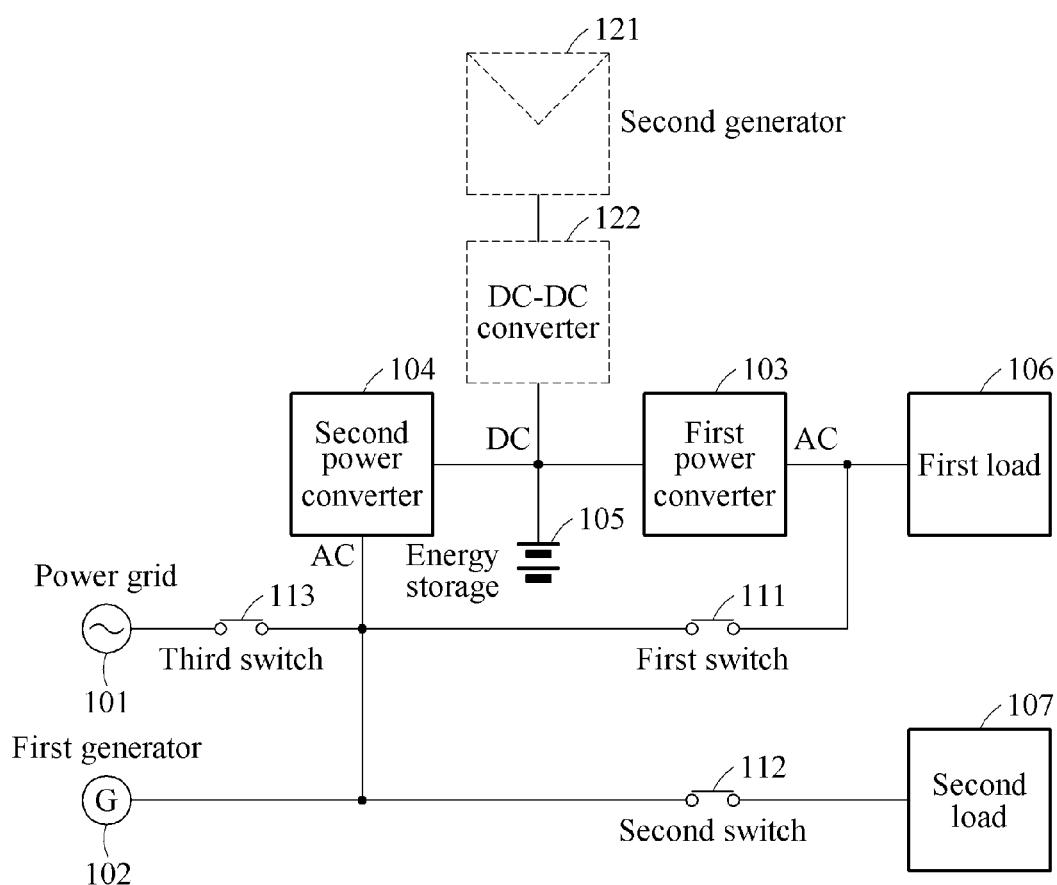
FIG. 1 is a diagram illustrating an overall configuration of an uninterruptible power supply apparatus according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms and include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

FIG. 1 is a diagram illustrating an overall configuration of an uninterruptible power supply apparatus according to an example embodiment.

According to an example embodiment, an uninterruptible power supply apparatus may uninterruptibly supply power to a load using a generator and a power conversion device. Even when a capacity of the power conversion device is insufficient, the uninterruptible power supply apparatus may uninterruptibly supply power to the load using the generator. In the present disclosure, the uninterruptible power supply apparatus may be referred to as a make-before-break (MBB) power supply apparatus.

Referring to FIG. 1, the uninterruptible power supply apparatus includes an energy storage device 105, a first power converter 103, a second power converter 104, a first load 106, a second load 107, a power grid 101, a first generator 102, a first switch 111, a second switch 112 and a third switch 113. The uninterruptible power supply apparatus may further include a direct current (DC)-to-DC (DC-DC) converter 122 and a second generator 121. The second generator 121 may include, for example, a solar power generator, however, is not limited thereto. For example, the second generator 121 may include various types of generators.

In the following description, a power conversion device may be referred to as a "power converter." Also, the energy storage device 105 may be referred to as an "energy storage" 105. The power grid 101 may be referred to as a "grid," and may include at least one power plant, a load and a conducting wire that connects the at least one power plant and the load.

A normal state may refer to a state in which the power grid 101 supplies power to the first load 106 or the second load 107. In the normal state, each of the third switch 113 and the first switch 111 may be connected to a conducting wire. The power grid 101 may be connected via the third switch 113 to the first load 106 or the second load 107. The first load 106 and the second load 107 may be connected to the power grid 101 by the first switch 111 and the second switch 112, respectively. In the normal state, the power grid 101 may supply power to the first load 106 or the second load 107.

When the normal state is changed to an independent operating state, the second power converter 104 may output a constant voltage corresponding to an output voltage of the power grid 101, and may turn off the third switch 113. When a temporary power failure occurs in the power grid 101, the first power converter 103 may uninterruptibly supply power to the first load 106. After the power failure, the second power converter 104 together with the first generator 102 may supply power to the first load 106 and the second load 107. An independent state of the first load 106 may refer to a state in which the first switch 111 is turned off. For example, the independent state of the first load 106 may include a state in which a temporary power failure occurs in the power grid 101.

The energy storage 105 may be connected to the first power converter 103. The energy storage 105 may be connected to the second power converter 104. The first switch 111 may be connected to the first power converter 103 and the first load 106. The second switch 112 may be connected to the second power converter 104, the first generator 102 and the second load 107. The third switch 113 may be connected to the power grid 101, the first generator 102, the second power converter 104, the first switch 111 and the second switch 112.

The independent operating state may refer to a state in which the third switch is turned off so that power is supplied to the first load 106 or the second load 107 regardless of the power grid 101. In the independent operating state, the first generator 102 or the energy storage 105 may uninterruptibly, directly or indirectly supply power to the first load 106 or the second load 107.

In the independent operating state, the second power converter 104 may supply power at a constant voltage (hereinafter, referred to as "constant-voltage power") to the first load 106 or the second load 107. When a temporary power failure occurs, the first power converter 103 may supply constant-voltage power to the first load 106. The first generator 102 may supply insufficient power to prevent an output of the second power converter 104 from exceeding a maximum allowable value based on an amount of power to be consumed by a load.

The second power converter 104 may perform charging and discharging of the energy storage 105 in the normal state. In the independent operating state, the second power converter 104 may supply constant-voltage power to a load. When the second power converter 104 charges the energy storage 105 with power, the second power converter 104 may function as a load because power of the power grid 101 is used by the second power converter 104. When power of the energy storage 105 is discharged by the second power converter 104, the second power converter 104 may function as a generator to generate power similarly to the first generator 102.

The first power converter 103 and the first switch 111 may be connected to the first load 106, and may supply power to the first load 106, together with the power grid 101. The first power converter 103 may be in a standby state in which the first power converter 103 does not operate in the normal state. When a temporary power failure is detected, the first power converter 103 may supply constant-voltage power to the first load 106.

The first generator 102 together with the power grid 101 may supply power to the first load 106 or the second load 107. When a power generation amount of the first generator 102 increases, an amount of power received from the power grid 101 may decrease. When the power generation amount of the first generator 102 and a power generation amount of the power grid 101 are greater than a sum of a power consumption amount of the first load 106 and a power consumption amount of the second load 107, power generated by the first generator 102 may be transmitted to the power grid 101.

The second generator 121 may charge the energy storage 105 through the DC-DC converter 122. The energy storage 105 may supply power to the first power converter 103 and the second power converter 104, so that the uninterruptible power supply apparatus may uninterruptibly supply power to a load.

According to an example embodiment, the uninterruptible power supply apparatus may stably supply power to loads using the first generator 102 and a power converter that have capacities that are less than a sum of power consumption amounts of the loads.

Figure 2:
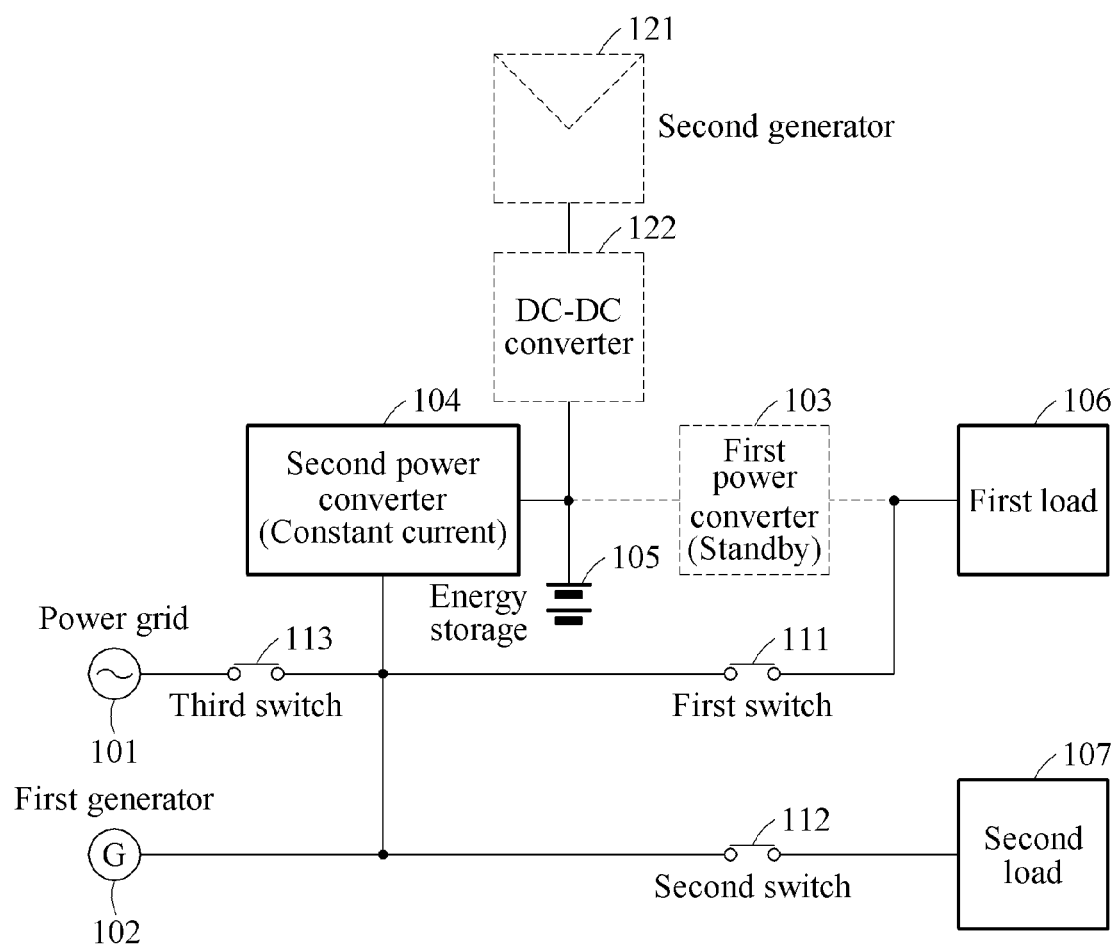
FIG. 2 is a diagram illustrating an operation of an uninterruptible power supply apparatus in a normal state according to an example embodiment.

FIG. 2 is a diagram illustrating an operation of an uninterruptible power supply apparatus in a normal state according to an example embodiment.

The first switch 111, the second switch 112 and the third switch 113 may be connected. The power grid 101 may supply power to the first load 106 or the second load 107. The first power converter 103 may be in a standby state in which the first power converter 103 does not operate. The first generator 102, or the second power converter 104 that is connected to the energy storage 105 may supply power together with power supplied by the power grid 101 based on the power consumption amount of the first load 106 and the power consumption amount of the second load 107.

The second power converter 104 and the first generator 102 may be synchronized with a voltage of the power grid 101, to additionally supply power to a load. The first generator 102 may adjust a power generation amount of the first generator 102 based on the power consumption amount of the first load 106 and the power consumption amount of the second load 107. When the power generation amount of the first generator 102 is equal to a sum of the power consumption amounts, power may not be received from the power grid 101. When the power generation amount of the first generator 102 is less than the sum of the power consumption amounts, power corresponding to an insufficient power amount may be received from the power grid 101.

Figure 3:
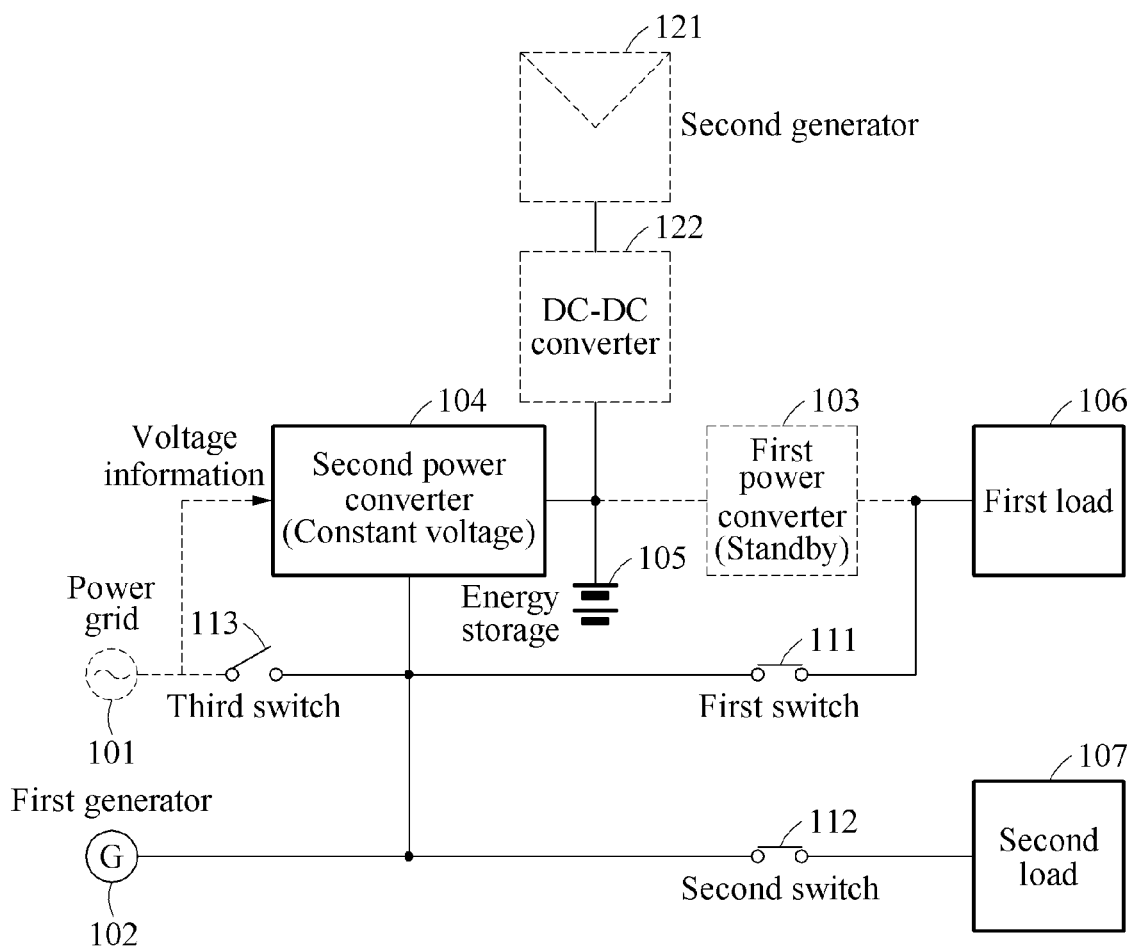
FIG. 3 is a diagram illustrating an operation of an uninterruptible power supply apparatus in an independent operating state according to an example embodiment.

FIG. 3 is a diagram illustrating an operation of an uninterruptible power supply apparatus in an independent operating state according to an example embodiment.

For example, the second power converter 104 may receive voltage information of the power grid 101, may identify a phase and a magnitude of a voltage from the received voltage information, and may generate constant-voltage power with the same phase and the same magnitude as the identified phase and the identified magnitude. In this example, the uninterruptible power supply apparatus may transition from a normal state to an independent operating state by turning off the third switch 113.

The uninterruptible power supply apparatus may change an output of the second power converter 104 from a constant current to a constant voltage in the normal state, so that the output of the second power convert 104 may have the same phase and the same magnitude as those of an output of the power grid 101. The uninterruptible power supply apparatus may transition from the normal state to an independent state (*the independent operating state by turning off the third switch. Prior to turning off the third switch, power output by the power grid 101 and power output by the second power converter 104 may temporally collide. However, when voltages of the above powers are the same, a collision effect may be mitigated.

In the independent operating state, the power grid 101 may no longer supply power to the first load 106 and the second load 107, and the first load 106 and the second load 107 may be independent of the power grid 101. The first power converter 103 may be in a standby state in which the first power converter 103 does not operate. The second power converter 104 connected to the energy storage 105 may supply constant-voltage power to the first load 106 or the second load 107. Thus, even in the independent operating state, the uninterruptible power supply apparatus may stably supply power to each load. The first generator 102 may supply power together with power supplied by the second power converter 104 based on a power consumption amount of the first load 106 and a power consumption amount of the second load 107. When the first generator 102 generates power corresponding to a sum of the power consumption amount of the first load 106 and the power consumption amount of the second load 107, the second power converter 104 may hardly generate an output.

For example, the sum of the power consumption amount of the first load 106 and the power consumption amount of the second load 107 may be greater than a maximum output of the second power converter 104. In this example, the first generator 102 may supply power corresponding to a power generation amount of the second power converter 104, so that a constant voltage of the second power converter 104 may be maintained. The first generator 102 may generate supplementary power, to maintain the power generation amount of the second power converter 104 so as to not to exceed a maximum output.

In an example, when a total power generation amount is less than the sum of the power consumption amount of the first load 106 and the power consumption amount of the second load 107, power corresponding to an insufficient amount of power may be supplied from the energy storage 105 to the first load 106 and the second load 107 through the second power converter 104. In another example, when the total power generation amount is greater than the sum of the power consumption amount of the first load 106 and the power consumption amount of the second load 107, the energy storage 105 may be charged with remaining power through the second power converter 104.

Figure 4:
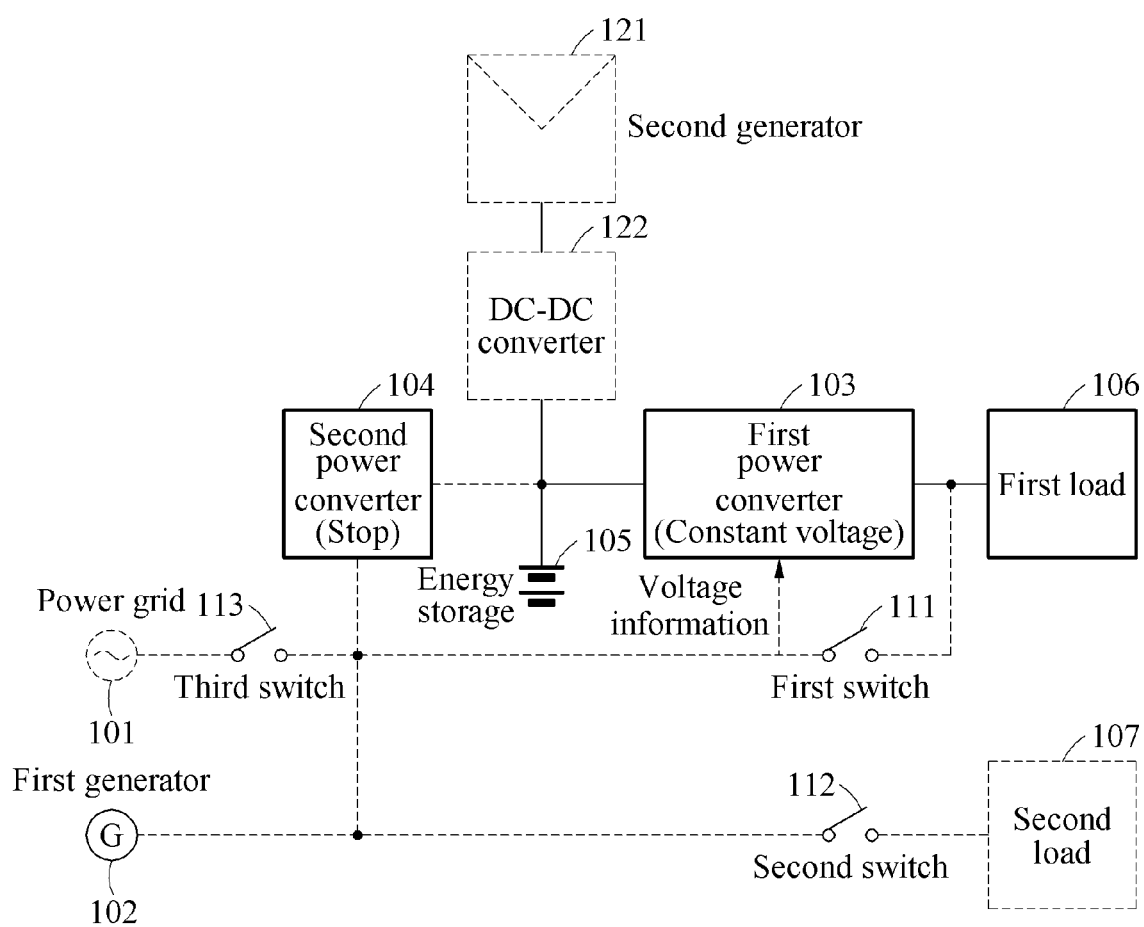
FIG. 4 is a diagram illustrating an operation of a first load in a temporary independent state due to a momentary power failure according to an example embodiment.

FIG. 4 is a diagram illustrating an operation of a first load in a temporary independent state due to a momentary power failure according to an example embodiment.

According to an example embodiment, in an independent state in which the power grid 101, the second power converter 104 and the first generator 102 do not operate due to a power failure, the uninterruptible power supply apparatus may turn off the first switch 111, so that the first power converter 103 may supply constant-voltage power corresponding to voltage information of the power grid 101 to the first load 106.

The first power converter 103 may receive the voltage information of the power grid 101 in the normal state. When a power failure is detected during continuous monitoring of the voltage information of the power grid 101 in the standby state, the first power converter 103 may turn off the first switch 111 and may supply constant-voltage power corresponding to the voltage information of the power grid 101 to the first load 106. Thus, even when the power grid 101 is interrupted due to the power failure, the first load 106 may uninterruptibly receive the supplied power.

For example, when a maximum power of the first power converter 103 is greater than a power consumption amount of the first load 106, energy stored in the energy storage 105 may be supplied to the first load 106 without an aid of the first generator 102, to cover the power consumption amount of the first load 106.

According to an example embodiment, the uninterruptible power supply apparatus may turn off the second switch 112 and the third switch 113 after a power failure. Thus, it is possible to cope with an unscheduled reoperation of the power grid 101.

Figure 5:
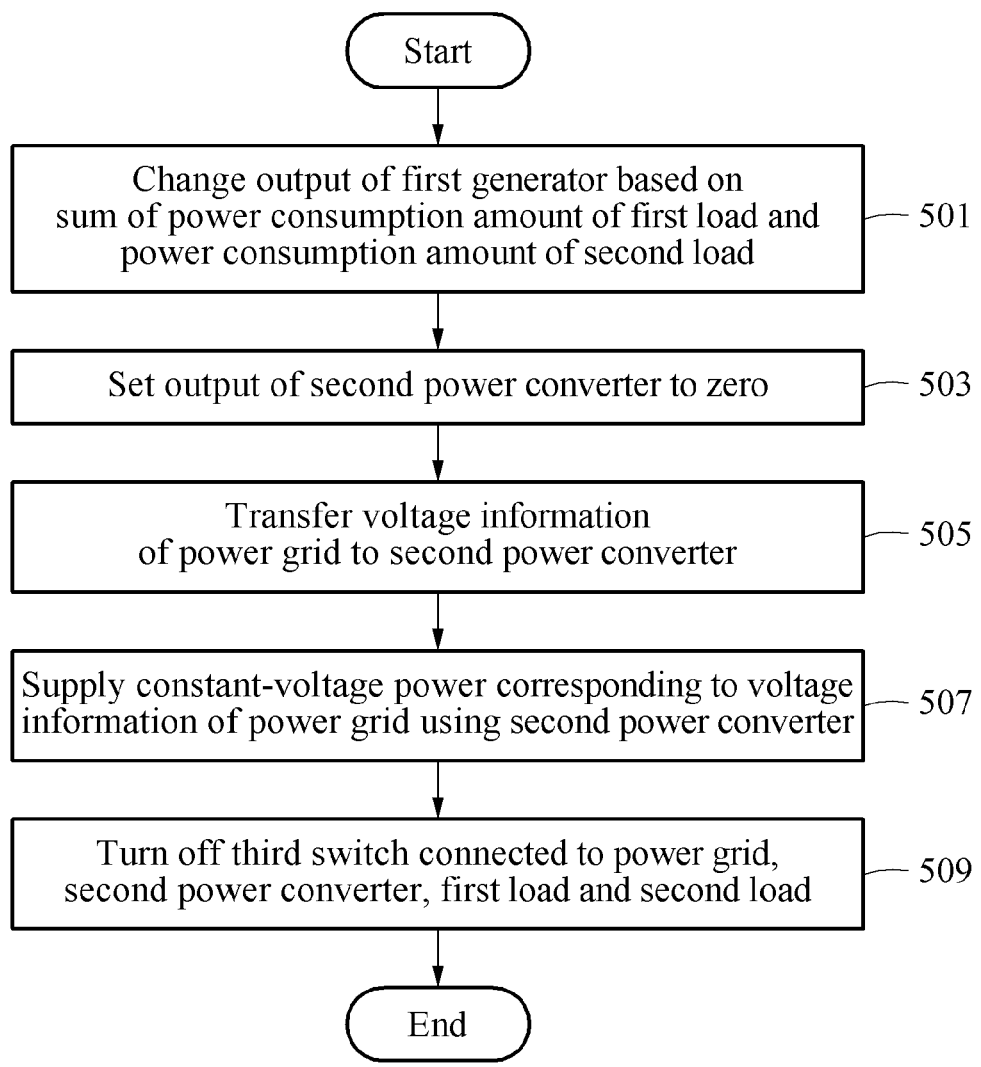
FIG. 5 is a flowchart illustrating an operation of changing a normal state to an independent operating state according to an example embodiment.

FIG. 5 is a flowchart illustrating an operation of changing a normal state to an independent operating state according to an example embodiment.

In operation 501, the uninterruptible power supply apparatus may change an output of the first generator 102 based on a sum of a power consumption amount of the first load 106 and a power consumption amount of the second load 107. The output of the first generator 102 may be the same as the sum of the power consumption amount of the first load 106 and the power consumption amount of the second load 107.

In operation 503, the uninterruptible power supply apparatus may set an output of the second power converter 104 to zero. Since the first generator 102 may cover both the power consumption amount of the first load 106 and the power consumption amount of the second load 107, the output of the second power converter 104 may be set to zero. Thus, power may be hardly received from the power grid 101.

In operation 505, the uninterruptible power supply apparatus may transfer voltage information of the power grid 101 to the second power converter 104. The uninterruptible power supply apparatus may continue to monitor the voltage information of the power grid 101 to analyze a phase and a magnitude of a voltage.

In operation 507, the uninterruptible power supply apparatus may supply constant-voltage power corresponding to the voltage information of the power grid 101 using the second power converter 104. For example, the second power converter 104 may supply constant-voltage power with the same phase and the same magnitude as a phase and a magnitude of a monitored voltage of the power grid 101. In this example, even when an output of the power grid 101 collides with an output of the second power converter 104, a collision effect may be mitigated due to the same voltage.

In operation 509, the uninterruptible power supply apparatus may turn off the third switch 113 connected to the power grid 101, the second power converter 104, the first load 106 and the second load 107. By turning off the third switch 113, a transition to the independent operating state may be uninterruptibly performed.

Figure 6:
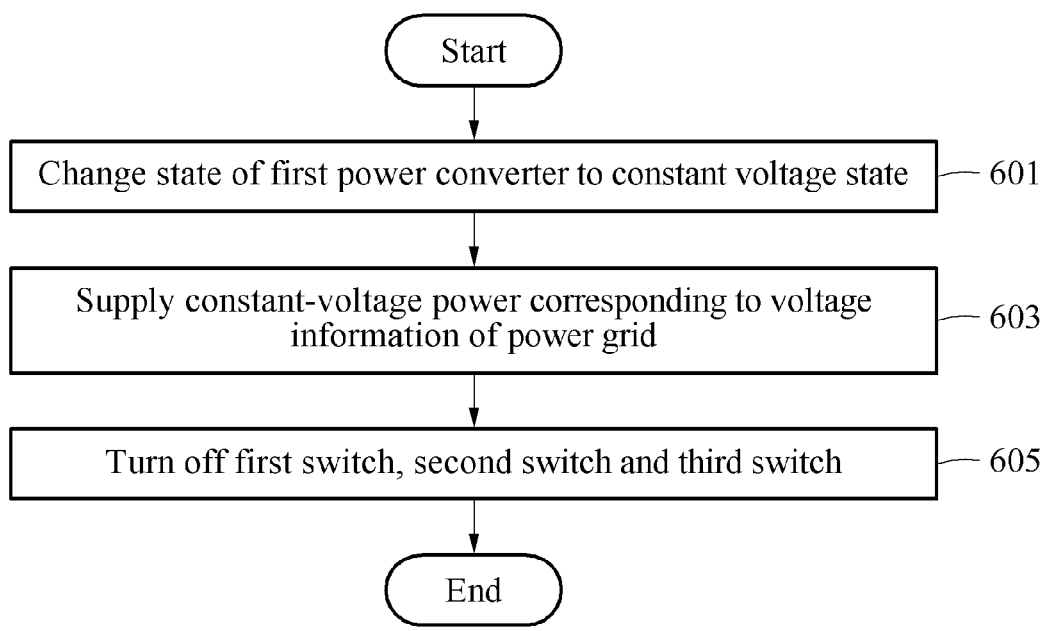
FIG. 6 is a flowchart illustrating an operation of changing a state of a first load to a temporary independent state due to a momentary power failure according to an example embodiment.

FIG. 6 is a flowchart illustrating an operation of changing a state of a first load to a temporary independent state due to a momentary power failure according to an example embodiment.

Due to a power failure, the power grid 101, the second power converter 104 and the first generator 102 may not operate. When a momentary power failure occurs in the power grid 101, the second power converter 104 and the first generator 102 may be stopped. A power supply to a second load may be interrupted. However, the state of the first load may be changed to an independent state in which the first load receives a supplied power by operations that will be described below.

Referring to FIG. 6, in operation 601, the uninterruptible power supply apparatus may change a state of the first power converter to a constant voltage state. Before a power failure occurs, voltage information of the power grid 101 may continue to be monitored.

In operation 603, the uninterruptible power supply apparatus may supply constant-voltage power corresponding to the voltage information of the power grid. When a power failure occurs, the uninterruptible power supply apparatus may supply constant-voltage power with the same phase and the same magnitude as a phase and a magnitude of a monitored voltage.

In operation 605, the uninterruptible power supply apparatus may turn off a first switch, a second switch and a third switch. The first switch may open or close a connection between the power grid, the first generator and the first load. The second switch may open or close a connection between the second load, the second power converter and the first generator. The third switch may open or close a connection between the power grid, the second power converter, the first load and the second load.

As described above, the uninterruptible power supply apparatus may supply power by quickly reflecting the voltage information of the power grid 101 to the first power converter 103 in response to an occurrence of a power failure, to uninterruptibly supply power to the first load.

Figure 7:
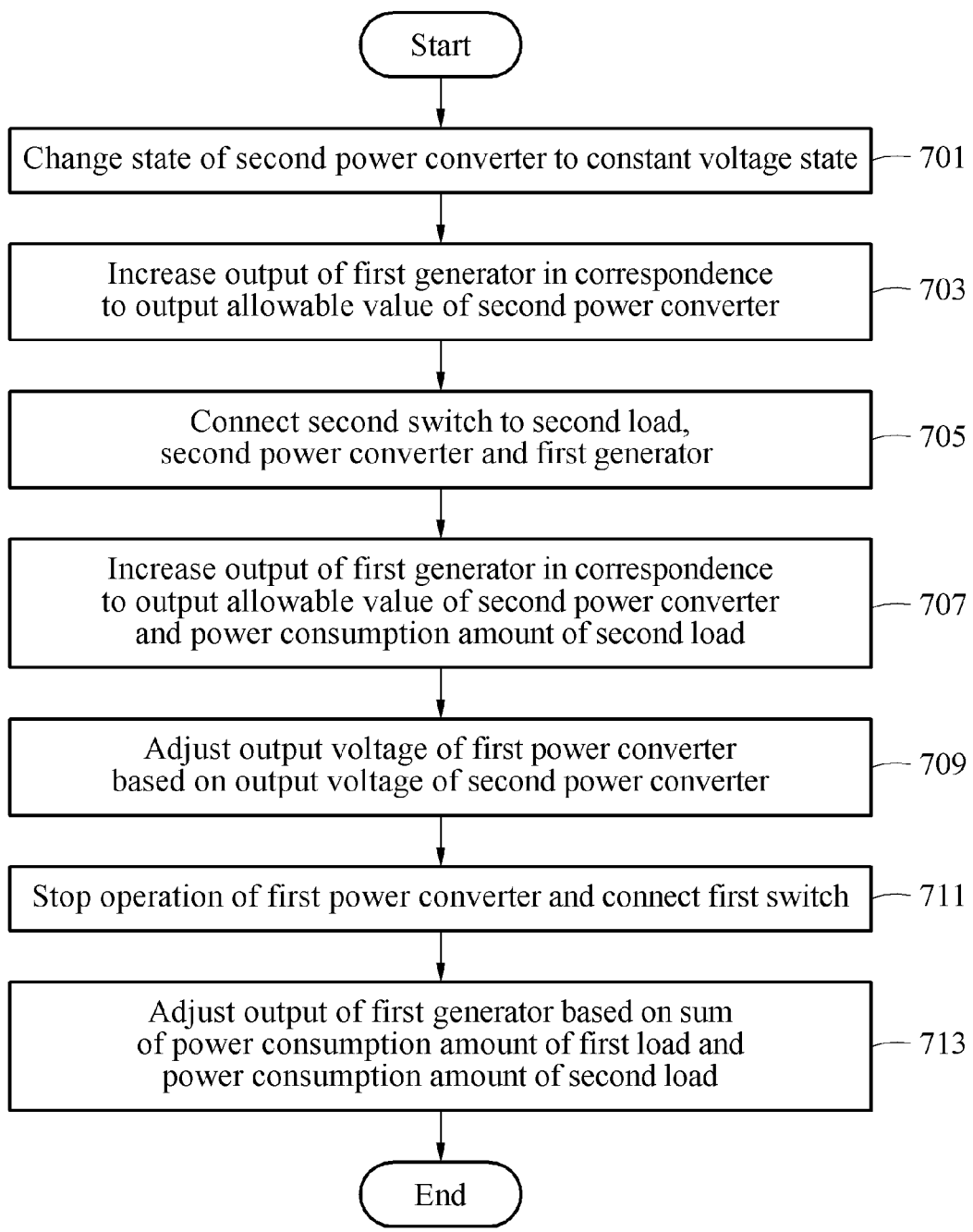
FIG. 7 is a flowchart illustrating an operation of changing a temporary independent state of a first load to an independent operating state according to an example embodiment.

FIG. 7 is a flowchart illustrating an operation of changing a temporary independent state of a first load to an independent operating state according to an example embodiment.

Referring to FIG. 7, in operation 701, the uninterruptible power supply apparatus may change a state of the second power converter 104 to a constant voltage state. For example, in an independent state of the first load 106, the second power converter 104 may be stopped and the first power converter 103 may supply power to the first load 106. In this example, the second power converter 104 may reflect voltage information of the first power converter 103 to an output voltage.

In operation 703, the uninterruptible power supply apparatus may increase an output of the first generator 102 in correspondence to an output allowable value of the second power converter 104. The output of the first generator 102 may be increased to a maximum allowable value. The second power converter 104 may charge the energy storage 105 with the same power as the output of the first generator 102. In operation 705, the uninterruptible power supply apparatus may connect the second switch 112 to the second load 107, the second power converter 104 and the first generator 102. When the second switch 112 is connected, the first generator 102 and the second power converter 104 may simultaneously supply power to the second load 107.

In operation 707, the uninterruptible power supply apparatus may increase the output of the first generator in correspondence to the output allowable value of the second power converter and a power consumption amount of the second load. The output of the first generator 102 may be increased by a sum of a maximum value (*maximum output value of the second power converter 104 and the power consumption amount of the second load 107. Thus, a portion of power generated by the first generator 102 may be consumed in the second load, and the remaining power may be used to charge the energy storage 105 through the second power converter 104.

In operation 709, the uninterruptible power supply apparatus may adjust an output voltage of the first power converter based on an output voltage of the second power converter. An output voltage of the first power converter 103 may be synchronized with an output voltage of the second power converter 104. Thus, an influence of a collision between voltages when a first switch is connected may be minimized.

In operation 711, the uninterruptible power supply apparatus may stop an operation of the first power converter and may connect the first switch. A state of the first power converter 103 may be changed to the standby state, and thus it is possible to prevent voltages from colliding.

In operation 713, the uninterruptible power supply apparatus may adjust the output of the first generator based on a sum of a power consumption amount of the first load and a power consumption amount of the second load. The output of the first generator may be set to be equal to a sum of a power consumption amount of the first load 106 and a power consumption amount of the second load 107.

In an example, when the second switch 112 is connected and when an amount of power generated by the first generator 102 is less than the power consumption amount of the second load 107, the energy storage 105 may be charged with the remaining power using the second power converter 104. In another example, when the amount of power generated by the first generator 102 is greater than the power consumption amount of the second load 107, insufficient power may be discharged from the energy storage 105 through the second power converter 104 and may be supplied.

While the output of the first generator 102 is being stored in the energy storage 105, the first switch 111 and the second switch 112 may be connected so that power may be supplied to the first load 106 and the second load 107. Thus, power may be supplied to a load that requires a power consumption amount greater than a maximum output.

Figure 8:
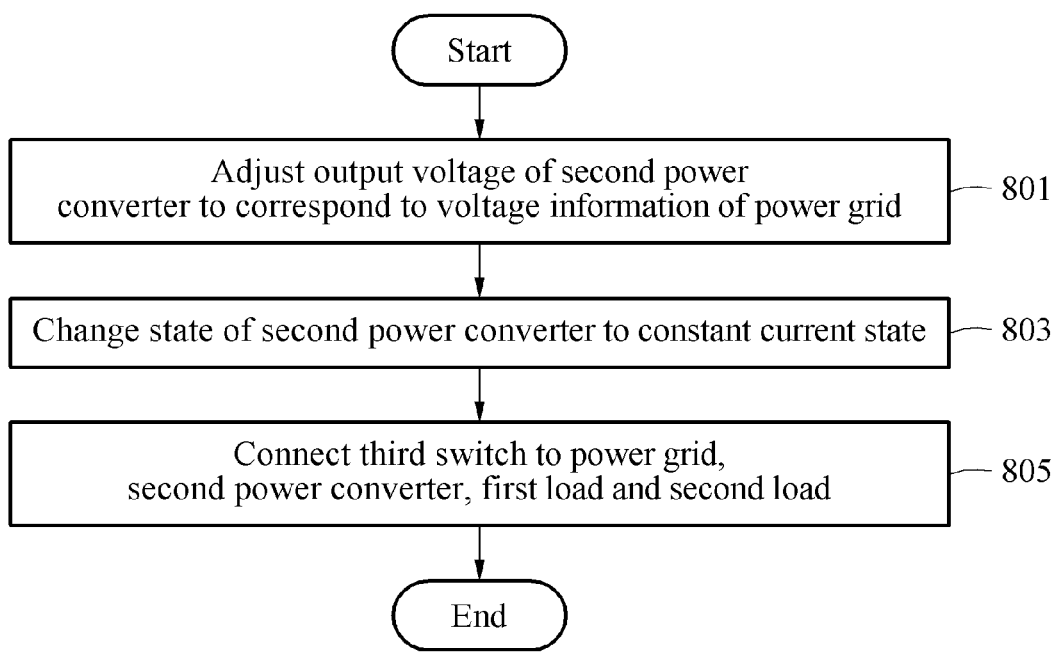
FIG. 8 is a flowchart illustrating an operation of changing an independent operating state to a normal state according to an example embodiment.

FIG. 8 is a flowchart illustrating an operation of changing an independent operating state to a normal state according to an example embodiment.

Referring to FIG. 8, in operation 801, the uninterruptible power supply apparatus may adjust an output voltage of the second power converter 104 to correspond to voltage information of the power grid 101. For example, the uninterruptible power supply apparatus may monitor voltage information of the power grid 101 with restored electricity to identify a phase and a magnitude of an output voltage. The uninterruptible power supply apparatus may synchronize a phase and a magnitude of the output voltage of the second power converter 104 to be the same as those of a voltage of the power grid 101.

In operation 803, the uninterruptible power supply apparatus may change a state of the second power converter 104 to a constant current state.

In operation 805, the uninterruptible power supply apparatus may connect the third switch 113 to the power grid 101, the second power converter 104, the first load 106 and the second load 107. Thus, the uninterruptible power supply apparatus may uninterruptibly change the independent operating state to the normal state.

According to example embodiments, it is possible to uninterruptibly supply power to loads using a generator and a power converter.

According to example embodiments, an uninterruptible power supply apparatus may uninterruptibly supply power to a load using a generator despite an insufficient capacity of a power converter.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The modules, apparatuses, and other components described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An uninterruptible power supply apparatus comprising:
a first generator;
an energy storage;
a first power converter connected to the energy storage;
a second power converter connected to the energy storage;
a first switch connected to the first power converter and a first load;
a second switch connected to the second power converter, the first generator and a second load; and
a third switch connected to a power grid, the first generator, the second power converter, the first switch and the second switch,
wherein:
in a normal state in which the first switch and the third switch are connected, the power grid supplies power to the first load or the second load,
in an independent operating state in which the third switch is turned off, the first generator or the energy storage uninterruptibly supplies power to the first load or the second load,
in the normal state, the first power converter receives voltage information of the power grid, and
in an independent state in which the power grid, the second power converter and the first generator do not operate due to a power failure, the first power converter supplies constant-voltage power corresponding to the voltage information to the first load by turning off the first switch.

2. The uninterruptible power supply apparatus of claim 1, wherein in the normal state,
the first power convertor does not operate, and
the second power converter connected to the energy storage, or the first generator supply power together with the power supplied from the power grid based on a power consumption amount of the first load and a power consumption amount of the second load.

3. The uninterruptible power supply apparatus of claim 1, wherein:
in the normal state, an output of the second power convertor is changed from a constant current to a constant voltage, to have the same magnitude and the same phase as those of an output of the power grid, and
the normal state is changed to the independent operating state by turning off the third switch.

4. The uninterruptible power supply apparatus of claim 1, wherein in the independent operating state,
the first power convertor does not operate,
the second power converter connected to the energy storage supplies constant-voltage power to the first load or the second load, and
the first generator supplies power together with power supplied from the second power converter based on a power consumption amount of the first load and a power consumption amount of the second load.

5. The uninterruptible power supply apparatus of claim 1, wherein the second switch and the third switch are turned off after the power failure.

6. An uninterruptible power supply method comprising:
changing an output of a first generator based on a sum of a power consumption amount of a first load and a power consumption amount of a second load;
setting an output of a second power converter to zero;
transferring voltage information of a power grid to the second power converter;
supplying, by the second power converter, constant-voltage power corresponding to the voltage information; and
turning off a third switch connected to the power grid, the second power converter, the first load and the second load.

7. An uninterruptible power supply method comprising:
when a power grid, a first generator and a second power converter do not operate due to a power failure,
changing a state of a first power converter to a constant voltage state;
supplying constant-voltage power corresponding to voltage information of the power grid; and
turning off a first switch, a second switch and a third switch,
wherein:
the first switch is configured to open or close a connection between the power grid, the first generator and a first load,
the second switch is configured to open or close a connection between a second load, the second power converter and the first generator, and
the third switch is configured to open or close a connection between the power grid, the second power converter, the first load and the second load.

* * * * *